(12) United States Patent
Oohata

(10) Patent No.: US 10,995,690 B2
(45) Date of Patent: May 4, 2021

(54) CONTROL DEVICE OF INTERNAL COMBUSTION ENGINE

(71) Applicant: HITACHI AUTOMOTIVE SYSTEMS, LTD., Hitachinaka (JP)

(72) Inventor: Eiichirou Oohata, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/650,200

(22) PCT Filed: Sep. 28, 2018

(86) PCT No.: PCT/JP2018/036212
§ 371 (c)(1),
(2) Date: Mar. 24, 2020

(87) PCT Pub. No.: WO2019/073815
PCT Pub. Date: Apr. 18, 2019

(65) Prior Publication Data
US 2020/0277912 A1    Sep. 3, 2020

(30) Foreign Application Priority Data
Oct. 12, 2017 (JP) .............................. JP2017-198308

(51) Int. Cl.
*F02D 41/14* (2006.01)
*F02D 41/30* (2006.01)
(Continued)

(52) U.S. Cl.
CPC ....... *F02D 41/1495* (2013.01); *F02D 35/023* (2013.01); *F02D 35/028* (2013.01);
(Continued)

(58) Field of Classification Search
CPC .......... F02D 13/06; F02D 17/02; F02D 41/22; F02D 41/1498; F02D 2041/0012;
(Continued)

(56) References Cited

U.S. PATENT DOCUMENTS

| 4,519,353 A | * | 5/1985 | Ito | ........................... F02D 41/22 |
| | | | | 123/198 DB |
| 4,520,780 A | * | 6/1985 | Ito | ......................... F02D 41/221 |
| | | | | 123/198 DB |

(Continued)

FOREIGN PATENT DOCUMENTS

| JP | 2004-301047 A | 10/2004 |
| JP | 2008-274811 A | 11/2008 |

(Continued)

OTHER PUBLICATIONS

International Search Report with English translation and Written Opinion issued in corresponding application No. PCT/JP2018/036212 dated Dec. 11, 2018.

*Primary Examiner* — John M Zaleskas
(74) *Attorney, Agent, or Firm* — Foley & Lardner LLP

(57) ABSTRACT

In an internal combustion engine, fluctuations in combustion torque are suppressed to reduce vibration and prevent deterioration of ride comfort of a driver. Therefore, a control device of an internal combustion engine 100 having a plurality of cylinders 150 (a first cylinder 151, a second cylinder 152, a third cylinder 153, and a fourth cylinder 154) includes a combustion state detection unit for detecting whether the plurality of cylinders 150 are in a normal combustion state or a flame-out state, and a control device 1 which controls driving of a fuel pump 131 that is a load of a combustion torque generated by the cylinder 150. The control device 1 suppresses the driving of the fuel pump 131 at a predetermined combustion timing of the cylinders 151 to 154 of the flame-out state in a case where it is determined (Continued)

that any one of the cylinders 151 to 154 among the plurality of cylinders 150 is in the flame-out state.

8 Claims, 11 Drawing Sheets

(51) Int. Cl.
  *F02D 41/22* (2006.01)
  *F02D 35/02* (2006.01)
  *F02M 59/10* (2006.01)
  *F02D 41/00* (2006.01)
(52) U.S. Cl.
  CPC ..... *F02D 41/1443* (2013.01); *F02D 41/1497* (2013.01); *F02D 41/22* (2013.01); *F02D 41/307* (2013.01); *F02D 41/009* (2013.01); *F02D 41/1498* (2013.01); *F02D 2200/024* (2013.01); *F02D 2200/10* (2013.01); *F02D 2200/1012* (2013.01); *F02D 2250/18* (2013.01); *F02M 59/102* (2013.01)
(58) Field of Classification Search
  CPC ....... F02D 2041/227; F02D 2200/1006; F02D 2200/1012; F02D 2200/1015; F02D 2250/18; F02M 59/102
  See application file for complete search history.

(56) References Cited

U.S. PATENT DOCUMENTS

| | | | | |
|---|---|---|---|---|
| 4,962,740 A * | 10/1990 | Fujimoto | ............... | G01M 15/11 123/481 |
| 8,342,151 B2 * | 1/2013 | Gwidt | ............... | F02D 41/40 123/357 |
| 2003/0110845 A1 * | 6/2003 | Kumagai | ............... | F02D 41/221 73/114.05 |
| 2003/0173123 A1 * | 9/2003 | Nakanowatari | ....... | B60W 10/08 180/65.225 |
| 2004/0107945 A1 * | 6/2004 | Yeo | ............... | F02D 41/0087 123/479 |
| 2005/0161024 A1 * | 7/2005 | Wang | ............... | F02M 59/04 123/456 |
| 2005/0257775 A1 * | 11/2005 | Kojima | ............... | F02M 59/102 123/458 |
| 2005/0257778 A1 * | 11/2005 | Albertson | ........... | F02D 41/0087 123/481 |
| 2006/0162700 A1 * | 7/2006 | Kubani | ............... | F02D 41/0087 123/479 |
| 2007/0221174 A1 * | 9/2007 | Hayakawa | .......... | F02D 41/3845 123/458 |
| 2007/0251500 A1 * | 11/2007 | Kikutani | ............... | F02M 59/366 123/458 |
| 2010/0030449 A1 * | 2/2010 | Ikoma | ............... | F02M 69/044 701/103 |
| 2013/0190962 A1 * | 7/2013 | Yokouchi | ............. | B60W 10/06 701/22 |
| 2014/0311450 A1 * | 10/2014 | Minami | ............. | F02D 41/0072 123/406.46 |
| 2014/0331975 A1 * | 11/2014 | Glugla | ............... | F04B 9/042 123/504 |
| 2014/0352659 A1 * | 12/2014 | Glugla | ............... | F02D 41/2406 123/350 |
| 2015/0000635 A1 * | 1/2015 | Nishio | ............... | F02D 35/023 123/332 |
| 2015/0337753 A1 * | 11/2015 | Stickler | ............... | F02M 63/005 123/506 |
| 2016/0298587 A1 * | 10/2016 | Nakano | ............... | F02M 51/04 |
| 2016/0363078 A1 * | 12/2016 | Nakano | ............... | F02D 41/40 |
| 2016/0377017 A1 * | 12/2016 | Basmaji | ............. | F02D 41/3094 701/103 |
| 2017/0350333 A1 * | 12/2017 | Glugla | ............... | F02D 41/1446 |
| 2019/0162132 A1 * | 5/2019 | Sugimoto | ............. | F02M 39/02 |

FOREIGN PATENT DOCUMENTS

| | | |
|---|---|---|
| JP | 2009-281335 A | 12/2009 |
| JP | 2016-121595 A | 7/2016 |

* cited by examiner

WAVEFORM OF IN-CYLINDER PRESSURE P
(NORMAL COMBUSTION STATE)

WAVEFORM OF IN-CYLINDER PRESSURE P
(FLAME-OUT STATE)

WAVEFORM OF IN-CYLINDER PRESSURE
(DIFFERENCE)

CONTROL DEVICE OF INTERNAL COMBUSTION ENGINE

TECHNICAL FIELD

The present invention relates to a control device for an internal combustion engine.

BACKGROUND ART

In recent years, to improve fuel efficiency of a vehicle, there is developed a control device of an internal combustion engine in which a technique of operation with an air-fuel mixture thinner than a theoretical air-fuel ratio, or a technique of taking part of post-combustion exhaust gas is incorporated.

In this type of control device for an internal combustion engine, the amounts of fuel and air in the combustion chamber deviate from the theoretical values, so that the combustion in the combustion chamber becomes unstable. As a result, in the vehicle, the vibration caused by the increase in the fluctuation of the combustion torque (engine torque) of the internal combustion engine increases, and the ride comfort of a driver deteriorates.

PTL 1 attempts to stabilize combustion in a case where the air-fuel ratio is lean by controlling an ignition device based on the in-cylinder pressure and a volume before ignition.

CITATION LIST

Patent Literature

PTL 1: JP 2008-274811 A

SUMMARY OF INVENTION

Technical Problem

The technology disclosed in PTL 1 assumes that a temperature distribution in the cylinder before ignition is uniform and there is no gas flow, and the temperature distribution and gas flow in the cylinder after actual ignition is not reflected. Therefore, combustion in the combustion chamber cannot be stabilized. As a result, in the internal combustion engine, the vibration due to the increase in the fluctuation of the combustion torque increases, and the ride comfort of the driver deteriorates.

Therefore, an object of the present invention is to reduce fluctuations in combustion torque in an internal combustion engine to reduce vibrations and prevent a driver's ride quality from deteriorating.

Solution to Problem

In order to solve the above problems, in a control device for an internal combustion engine having a plurality of cylinders, a combustion state detection unit that detects whether a plurality of cylinders are in a normal combustion state or an abnormal combustion state, and a control unit that controls driving of a vehicle auxiliary machine that is a load of a combustion torque generated in the cylinder. The control unit suppresses the driving of the vehicle auxiliary machine at a predetermined combustion timing of the cylinder of the abnormal combustion state in a case where it is determined that any one of the plurality of cylinders is in an abnormal combustion state.

Advantageous Effects of Invention

According to this invention, in an internal combustion engine, the vibration can be reduced by suppressing the fluctuation of the combustion torque, and the deterioration of the ride comfort of the driver can be prevented.

DESCRIPTION OF EMBODIMENTS

Hereinafter, a control device 1 for an internal combustion engine according to an embodiment of the invention will be described. In the embodiment, a case where the control device 1 controls an in-line four-cylinder internal combustion engine 100 will be described as an example.

Hereinafter, in the embodiment, a combination of some or all of the configurations of the internal combustion engine 100 and some or all of the configurations of the control device 1 will be referred to as the control device 1 of the internal combustion engine 100.

[Internal Combustion Engine]

Figure 1:
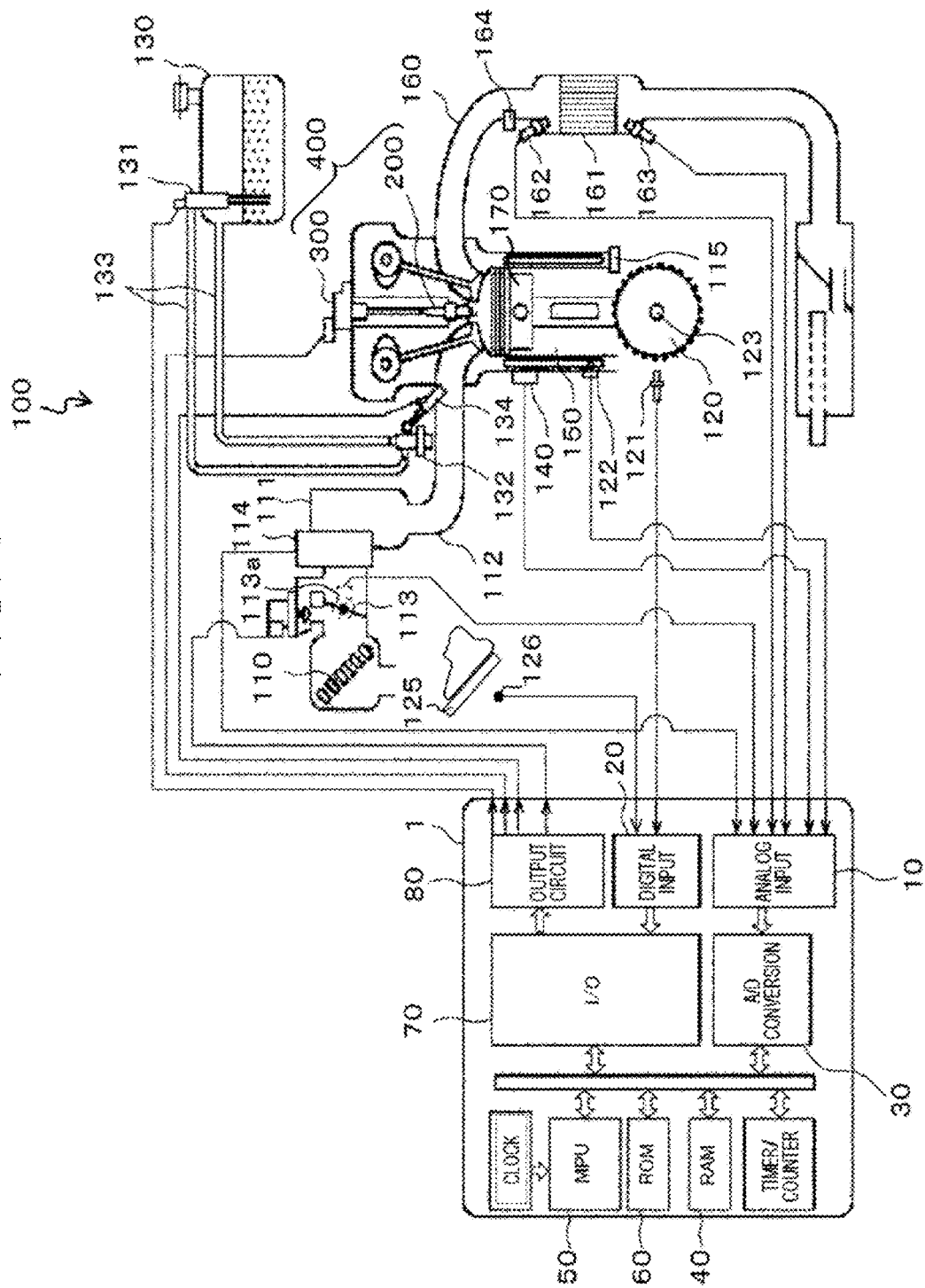
FIG. 1 is a diagram for describing a configuration of an internal combustion engine and main parts of a control device of the internal combustion engine according to an embodiment.

FIG. 1 is a diagram for describing the configuration of main parts of the control device 1 of the internal combustion engine 100.

Figure 2:
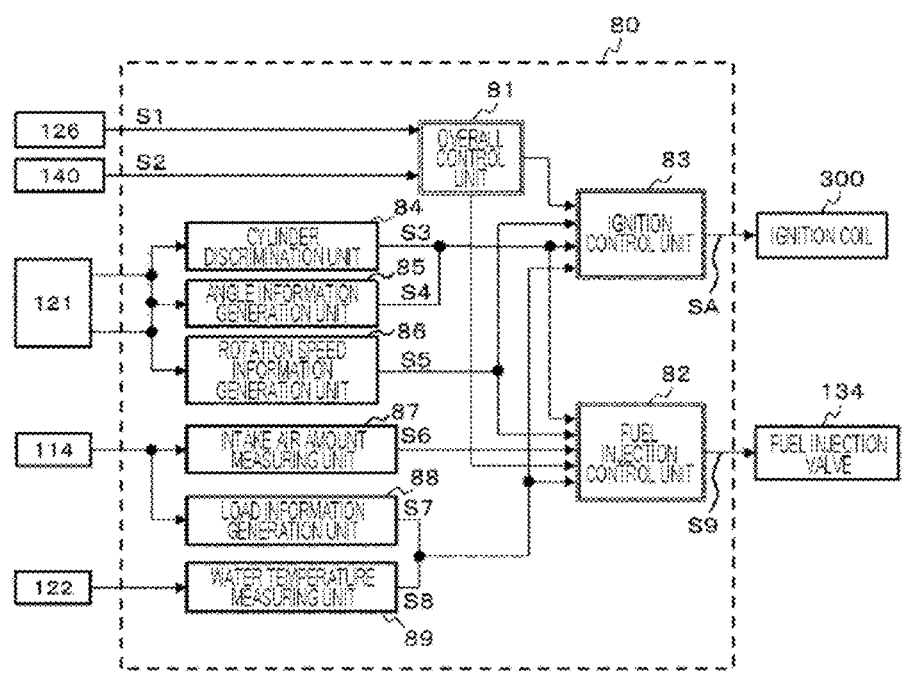
FIG. 2 is a functional block diagram for describing a functional configuration of the control device.

FIG. 2 is a functional block diagram for describing the functional configuration of the control device 1.

In the internal combustion engine 100, air sucked from the outside flows through an air cleaner 110, an intake pipe 111, and an intake manifold 112, and flows into each cylinder 150. The amount of air flowing into each cylinder 150 is adjusted by a throttle valve 113, and the amount of air adjusted by the throttle valve 113 is measured by a flow sensor 114.

The throttle valve 113 is provided with a throttle opening sensor 113a for detecting the opening of the throttle, and opening information of the throttle valve 113 detected by the throttle opening sensor 113a is output to the control device (Electronic Control Unit: ECU) 1.

An electronic throttle valve driven by an electric motor is used as the throttle valve 113. However, any other types may be used as long as the air flow rate can be adjusted appropriately.

The temperature of the air flowing into each cylinder 150 is detected by an intake air temperature sensor 115.

A crank angle sensor 121 is provided on the outer side in the radial direction of a ring gear 120 attached to a crank shaft 123, and the crank angle sensor 121 detects a rotation angle of the crank shaft (not illustrated). In the embodiment, the crank angle sensor 121 detects the rotation angle of the crank shaft 123 every 10° and every combustion cycle.

A water temperature sensor 122 is provided in a water jacket (not illustrated) of the cylinder head 180 (see FIG. 3), and the water temperature sensor 122 detects the temperature of the cooling water of the internal combustion engine 100.

In addition, a vehicle is also equipped with an accelerator position sensor (APS) 126 that detects the amount of displacement (depression amount) of an accelerator pedal 125. The accelerator position sensor 126 detects a required torque of a driver. The required torque of a driver detected by the accelerator position sensor 126 is output to the control device 1 described below. The control device 1 controls the throttle valve 113 on the basis of this required torque.

The fuel stored in a fuel tank 130 is sucked and pressurized by a fuel pump 131, then flows through a fuel pipe 133 provided with a pressure regulator 132, and is guided to a fuel injection valve (injector) 134. The fuel output from the fuel pump 131 is adjusted to a predetermined pressure by the pressure regulator 132 and injected into each cylinder 150 from the fuel injection valve 134. As a result of pressure adjustment by the pressure regulator 132, excess fuel is returned to the fuel tank 130 through a return pipe (not illustrated).

The cylinder head 180 (see FIG. 3) of the internal combustion engine 100 is provided with a combustion pressure sensor (also referred to as a cylinder pressure sensor (CPS) or an in-cylinder pressure sensor) 140. The combustion pressure sensor 140 is provided in each cylinder 150 and detects the pressure (combustion pressure) in the cylinder 150.

The combustion pressure sensor 140 is a vibration detection type sensor that measures mechanical vibration of the internal combustion engine 100. In the embodiment, the combustion pressure sensor 140 is a non-resonance type vibration detection sensor, and can detect the vibration of the internal combustion engine 100 over a wide frequency band.

Each cylinder 150 is provided with an exhaust manifold 160 that discharges the post-combustion gas (exhaust gas) to the outer side of the cylinder 150. A three-way catalyst 161 is provided on the exhaust side of the exhaust manifold 160, and the exhaust gas is purified by the three-way catalyst 161 and then discharged to the atmosphere.

An upstream air-fuel ratio sensor 162 and an exhaust gas temperature sensor 164 are provided on the upstream side of the three-way catalyst 161. The upstream air-fuel ratio sensor 162 continuously detects the air-fuel ratio of the exhaust gas discharged from each cylinder 150. The exhaust gas temperature sensor 164 measures the temperature of the exhaust gas discharged from the cylinder 150.

A downstream air-fuel ratio sensor 163 is provided on a downstream side of the three-way catalyst 161. The downstream air-fuel ratio sensor 163 outputs a switch-like detection signal in the vicinity of a theoretical air-fuel ratio. In the embodiment, the downstream air-fuel ratio sensor 163 is an O2 sensor.

In addition, the ignition plug 200 is provided at the upper portion of each cylinder 150, and a spark ignites an air-fuel mixture in the cylinder 150 by the discharge (ignition) of the ignition plug 200. An explosion occurs in the cylinder 150 and a piston 170 is pushed down. When the piston 170 is pushed down, the crank shaft 123 rotates.

An ignition coil (not illustrated) that generates a voltage supplied to the ignition plug 200 is connected to the ignition plug 200, and the voltage generated by the ignition coil (not illustrated) causes discharging between a center electrode (not illustrated) and an outer electrode (not illustrated) of the ignition plug 200.

Returning to FIG. 1, output signals from various sensors such as the throttle opening sensor 113a, the flow sensor 114, the crank angle sensor 121, the accelerator position sensor 126, the water temperature sensor 122, and the combustion pressure sensor 140 described above are output to the control device 1. The control device 1 detects the operating state of the internal combustion engine 100 on the basis of the output signals from these various sensors, and controls the amount of air (target air amount) flowing into the cylinder 150, a fuel injection amount, and an ignition timing of the ignition plug 200.

The target air amount calculated by the control device 1 is converted from a throttle opening (target throttle opening) to an electronic throttle drive signal, and output to an electric motor (not illustrated) that drives the throttle valve 113. Further, the ignition timing calculated by the control device 1 is output to an ignition coil (not illustrated) as an ignition signal converted into an energization start angle and an energization angle, and discharged (ignited) by an ignition plug 200 based on the ignition signal.

[Hardware Configuration of Control Device]

Next, the overall hardware configuration of the control device 1 will be described.

As illustrated in FIG. 1, the control device 1 includes an analog input unit 10, a digital input unit 20, an A/D (Analog/Digital) conversion unit 30, a RAM (Random Access Memory) 40, and an MPU (Micro-Processing unit) 50, a ROM (Read Only Memory) 60, an I/O (Input/Output) port 70, and an output circuit 80.

The analog input unit 10 includes analog output signals from various types of sensors such as the throttle opening sensor 113a, the flow sensor 114, the accelerator position sensor 126, the upstream air-fuel ratio sensor 162, the downstream air-fuel ratio sensor 163, the combustion pressure sensor 140, and the water temperature sensor 122.

The A/D conversion unit 30 is connected to the analog input unit 10. The analog output signals from various sensors input to the analog input unit 10 are subjected to signal processing such as noise removal, and then converted into digital signals by the A/D conversion unit 30 and stored in the RAM 40.

The digital output signal from the crank angle sensor 121 is input to the digital input unit 20.

The I/O port 70 is connected to the digital input unit 20, and the digital output signal input to the digital input unit 20 is stored in the RAM 40 via the I/O port 70.

Each output signal stored in the RAM 40 is performed calculation processing by the MPU 50.

The MPU 50 executes a control program (not illustrated) stored in the ROM 60, thereby performing calculation processing of the output signal stored in the RAM 40 according to the control program. The MPU 50 calculates a control value that defines the operation amount of each actuator (for example, the throttle valve 113, the pressure regulator 132, the ignition plug 200, etc.) that drives the internal combustion engine 100 according to the control program, and temporarily stores the control value in the RAM 40.

The control value that defines the operation amount of the actuator stored in the RAM 40 is output to the output circuit 80 via the I/O port 70.

The output circuit 80 is provided with a function of an ignition control unit 83 (see FIG. 3) that controls a voltage applied to the ignition plug 200.

[Functional Block of Control Device]

Next, the functional configuration of the control device 1 will be described.

FIG. 2 is a functional block diagram for describing the functional configuration of the control device 1. Each function of the control device 1 is realized by the output circuit 80 by the MPU 50 executing the control program stored in the ROM 60.

As illustrated in FIG. 2, the output circuit 80 of the control device 1 includes an overall control unit 81, a fuel injection control unit 82, and the ignition control unit 83.

The overall control unit 81 is connected to the accelerator position sensor 126 and the combustion pressure sensor 140 (CPS), and receives a required torque (acceleration signal S1) from the accelerator position sensor 126 and the output signal S2 from the combustion pressure sensor 140.

The overall control unit 81 performs overall control of the fuel injection control unit 82 and the ignition control unit 83 on the basis of the required torque (acceleration signal S1) from the accelerator position sensor 126 and the output signal S2 from the combustion pressure sensor 140.

In the embodiment, at least the combustion pressure (vibration: output signal S2) information from the combustion pressure sensor 140 is input to the overall control unit 81, and the overall control unit 81 detects the combustion pressure based on this information, and the occurrence of knocking.

The fuel injection control unit 82 is connected to a cylinder discrimination unit 84 that discriminates each cylinder 150 of the internal combustion engine 100, an angle information generation unit 85 that measures the crank angle of the crank shaft 123, and a rotation speed information generation unit 86 that measures the engine speed, and receives cylinder discrimination information S3 from the cylinder discrimination unit 84, crank angle information S4 from the angle information generation unit 85, and engine rotation speed information S5 from the rotation speed information generation unit 86.

Further, the fuel injection control unit 82 is connected to an intake air amount measuring unit 87 that measures the amount of air taken into the cylinder 150, a load information generation unit 88 that measures the engine load, and a water temperature measuring unit 89 which measures the temperature of an engine coolant, and receives intake air amount information S6 from the intake air amount measuring unit 87, engine load information S7 from the load information generation unit 88, and coolant temperature information S8 from the water temperature measuring unit 89.

The fuel injection control unit 82 calculates the fuel injection amount injected from the fuel injection valve 134 and the injection time (fuel injection valve control information S9) on the basis of the received information, and controls the fuel injection valve 134 on the basis of the calculated fuel injection amount and calculated injection time.

In addition to the overall control unit 81, the ignition control unit 83 is connected to the cylinder discrimination unit 84, the angle information generation unit 85, the rotation speed information generation unit 86, the load information generation unit 88, and the water temperature measuring unit 89, and receives information therefrom.

Based on the received information, the ignition control unit 83 calculates an energization amount (energization angle) for energizing a primary coil (not illustrated) of the ignition coil (not illustrated), an energization start time, and timing (ignition timing) to cut off the current for energizing the primary coil (not illustrated).

The ignition control unit 83 controls ignition by the ignition plug 200 by outputting an ignition signal SA to the primary coil (not illustrated) of the ignition coil (not illustrated) on the basis of the calculated energization amount, energization start time, and ignition timing.

Further, the combustion pressure (in-cylinder pressure) information from the overall control unit 81 and knocking information are input to the ignition control unit 83.

The ignition control unit 83 calculates a correction value of the ignition timing by the MBT control based on combustion pressure information, and calculates a retard correction value based on the knocking information. The ignition control unit 83 executes a minimum advance for the best torque (MBT) control or a retard control when knocking occurs based on the calculation results.

[Main Configuration of Internal Combustion Engine]

Next, a main configuration of the internal combustion engine 100 (vehicle direct injection gasoline engine) to which the control device 1 according to the embodiment is applied will be described.

Figure 3:
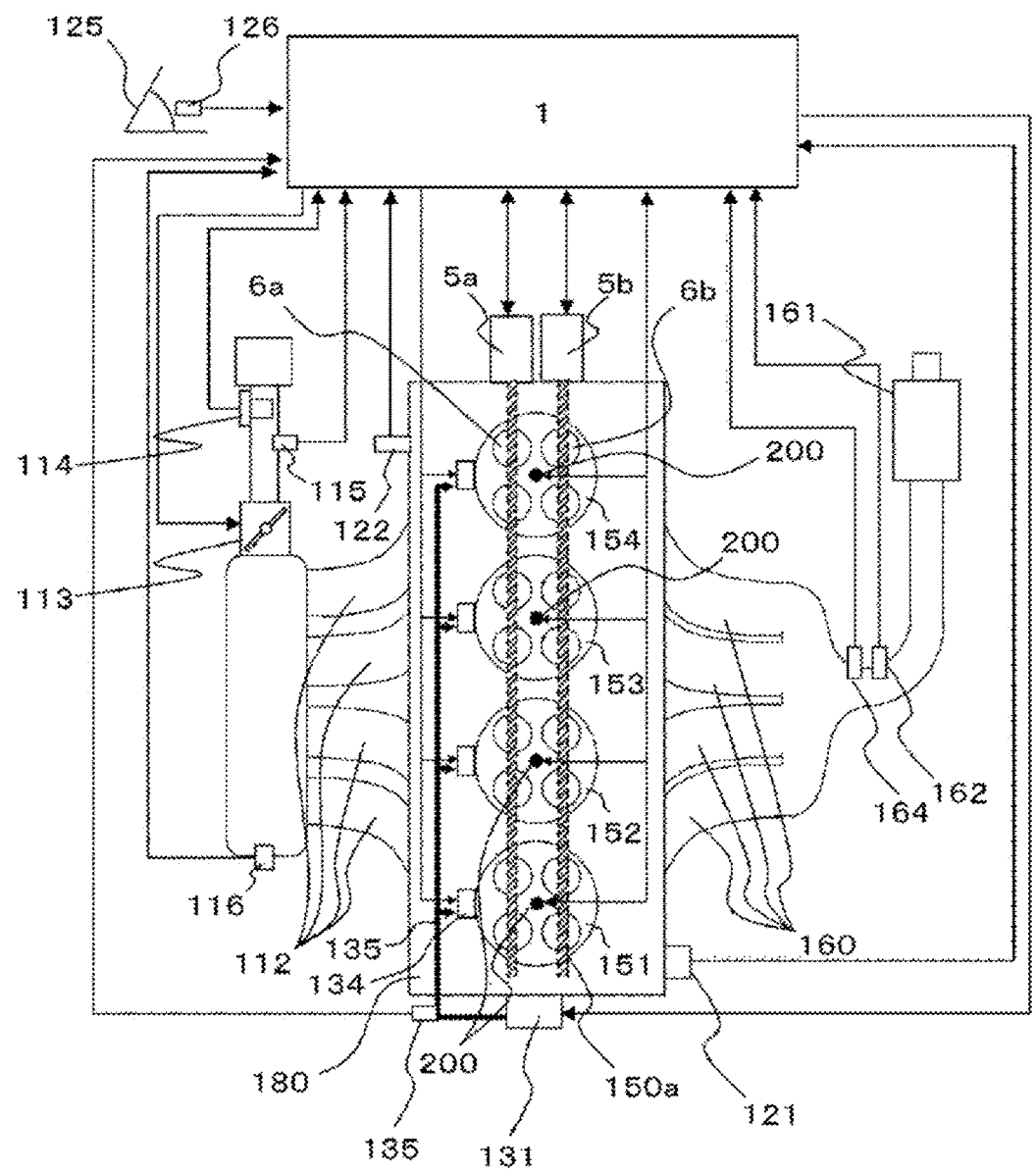
FIG. 3 is a schematic view for describing a main configuration of an internal combustion engine to which the control device is applied.

FIG. 3 is a schematic view for describing a main configuration of the internal combustion engine 100 (vehicle direct injection gasoline engine) to which the control device 1 is applied.

Figure 4:
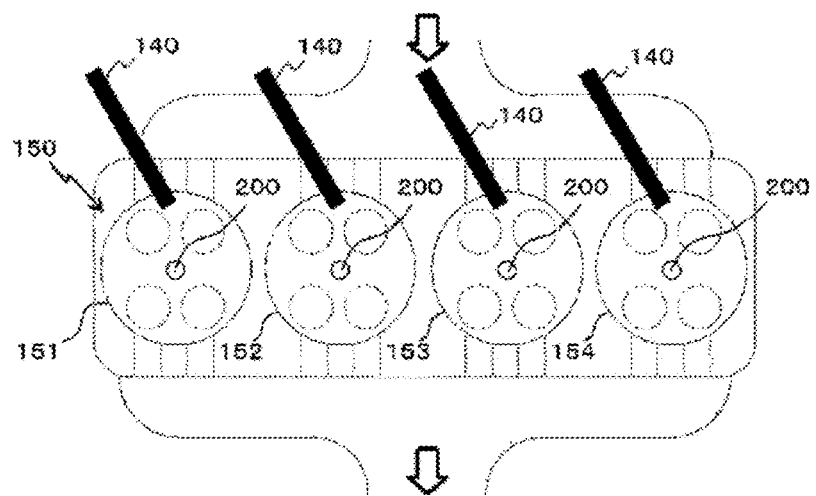
FIG. 4 is a plan view for describing an arrangement of cylinders.

FIG. 4 is a plan view for describing the arrangement of each cylinder 150.

As illustrated in FIG. 3, the internal combustion engine 100 according to the embodiment will be described as an example of an in-line four-cylinder gasoline engine for a vehicle that performs spark ignition combustion.

As illustrated in FIG. 4, in the internal combustion engine 100, a first cylinder 151, a second cylinder 152, a third cylinder 153, and a fourth cylinder 154 are provided in series in a cylinder block (not illustrated). Hereinafter, when the first cylinder 151 to the fourth cylinder 154 are not particularly distinguished, they are simply referred to as the cylinder 150.

The ignition plug 200 and the combustion pressure sensor 140 are mounted in a combustion chamber 150*a* of each cylinder 150. In a case where the internal combustion engine 100 is an in-line four-cylinder engine, in the combustion chamber 150*a* of each cylinder 150, ignition and combustion are performed by the ignition plug 200 at a rotation angle of the crank shaft 123 of 180 degrees. The combustion in each cylinder 150 is performed in the order of the first cylinder 151, the third cylinder 153, the fourth cylinder 154, and the second cylinder 152.

The pressure of the air flowing into each cylinder 150 is measured by an intake pressure sensor 116 provided in the intake manifold 112.

Above each cylinder 150, a cylinder head 180 is provided. The cylinder head 180 is provided with an intake camshaft 5a that operates an intake valve 6a to adjust the intake of an air-fuel mixture (air-fuel mixture) into the cylinder 150, and an exhaust camshaft 5b that operates an exhaust valve 6b to adjust the exhaust of the exhaust gas from the cylinder 150.

[Fuel Pump]

Next, the fuel pump 131 that supplies high-pressure fuel to the fuel injection valve 134 will be described.

Figure 5:
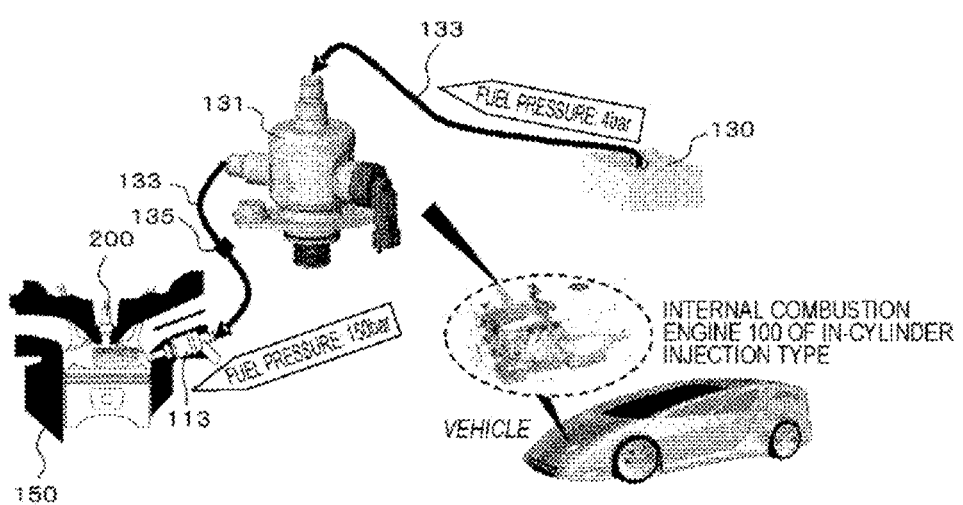
FIG. 5 is a schematic view for describing a fuel pump.

FIG. 5 is a schematic view for describing the fuel pump 131.

As illustrated in FIG. 5, the fuel pump 131 is connected to a fuel tank 130 and a fuel injection valve 134 by a fuel pipe 133. The fuel pump 131 is connected to the intake camshaft 5a, and is driven by rotation of the intake camshaft 5a. A fuel pressure sensor 135 for measuring the fuel injection pressure at the fuel injection valve 134 is provided in the fuel pipe 133.

The fuel pump 131 sends the fuel to the fuel injection valve 134 after increasing the pressure of the fuel supplied from the fuel tank 130. The fuel injection valve 134 has a built-in ON-OFF valve, and injects fuel into the cylinder 150 of the internal combustion engine 100 by opening the valve.

Next, the operation principle of the fuel pump 131 will be described.

Figure 6:
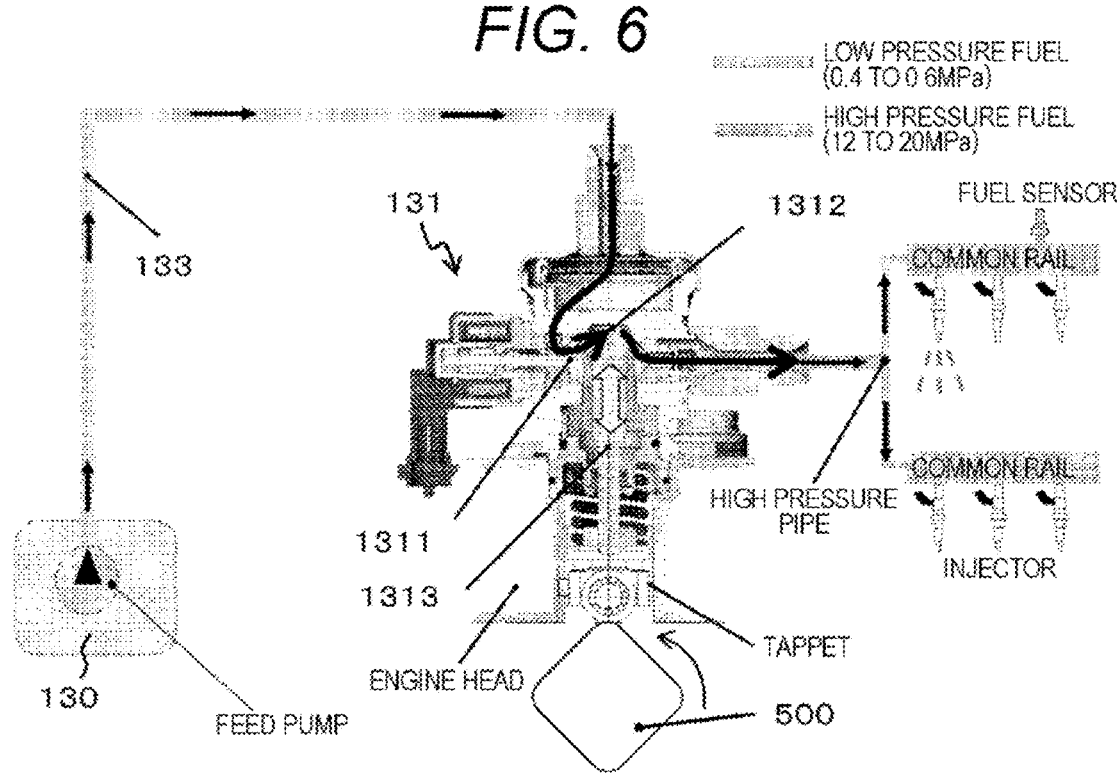
FIG. 6 is a diagram for describing the operation principle of the fuel pump.

FIG. 6 is a diagram for describing the operation principle of the fuel pump 131.

As illustrated in FIG. 6, the fuel pump 131 closes a suction valve 1311 at a predetermined timing after fuel (arrow) is introduced from the suction valve 1311 into a pressurizing chamber 1312.

Next, in the fuel pump 131, the fuel pressure in the pressurizing chamber 1312 rises due to the rise of a plunger 1313 accompanying the rotation of a pump drive cam 500.

The fuel pump 131 opens the suction valve 1311 when the fuel pressure in the pressurizing chamber 1312 measured by a fuel pressure sensor (not illustrated) reaches a target value.

The pressurizing process of the fuel pump 131 is a process from closing the suction valve 1311 to opening. During this period, the drive torque of the pump drive cam 500 is needed because the plunger 1313 is operated by rotating the pump drive cam 500.

Since the pump drive cam 500 is interlocked with the crank shaft 123 of the internal combustion engine 100, the drive torque of the pump drive cam 500 becomes a reaction force with respect to the combustion torque (engine torque) generated by combustion of the internal combustion engine 100. The sum of the drive torque of the pump drive cam 500 and the combustion torque is output to the outside as the engine torque of the internal combustion engine 100.

Here, in the embodiment, the pump drive cam 500 has a basic shape of a quadrangular shape in a sectional view. The pump drive cam 500 makes one rotation (360-degree rotation) for every time the crank shaft 123 makes two rotations (720-degree rotation). Therefore, every time the crank shaft 123 rotates half a turn (180 degrees), the drive torque of the pump drive cam 500 acts as a load on the crank shaft 123.

The shape of the pump drive cam 500 can be appropriately determined according to the number of cylinders of the internal combustion engine 100, and it is desirable that the number of vertices of the pump drive cam 500 (for example, four vertices of a square) is equal to the number of cylinders. For example, in the case of a six-cylinder internal combustion engine, two triangular pump drive cams may be used to match the total number of vertices of the pump drive cams to the number of cylinders. In the case of eight-cylinder internal combustion engine, two rectangular pump drive cams may be used to match the total number of vertices of the pump drive cams to the number of cylinders.

In addition, in the embodiment, the control device 1 controls the suction valve 1311 of the fuel pump 131 to be closed after the piston 170 in the cylinder 150 has exceeded the top dead center. Therefore, the mounting position of the pump drive cam 500 around the rotation axis is set so that the plunger 1313 is operated in the ascending direction after the piston 170 has exceeded the top dead center.

Figure 11:
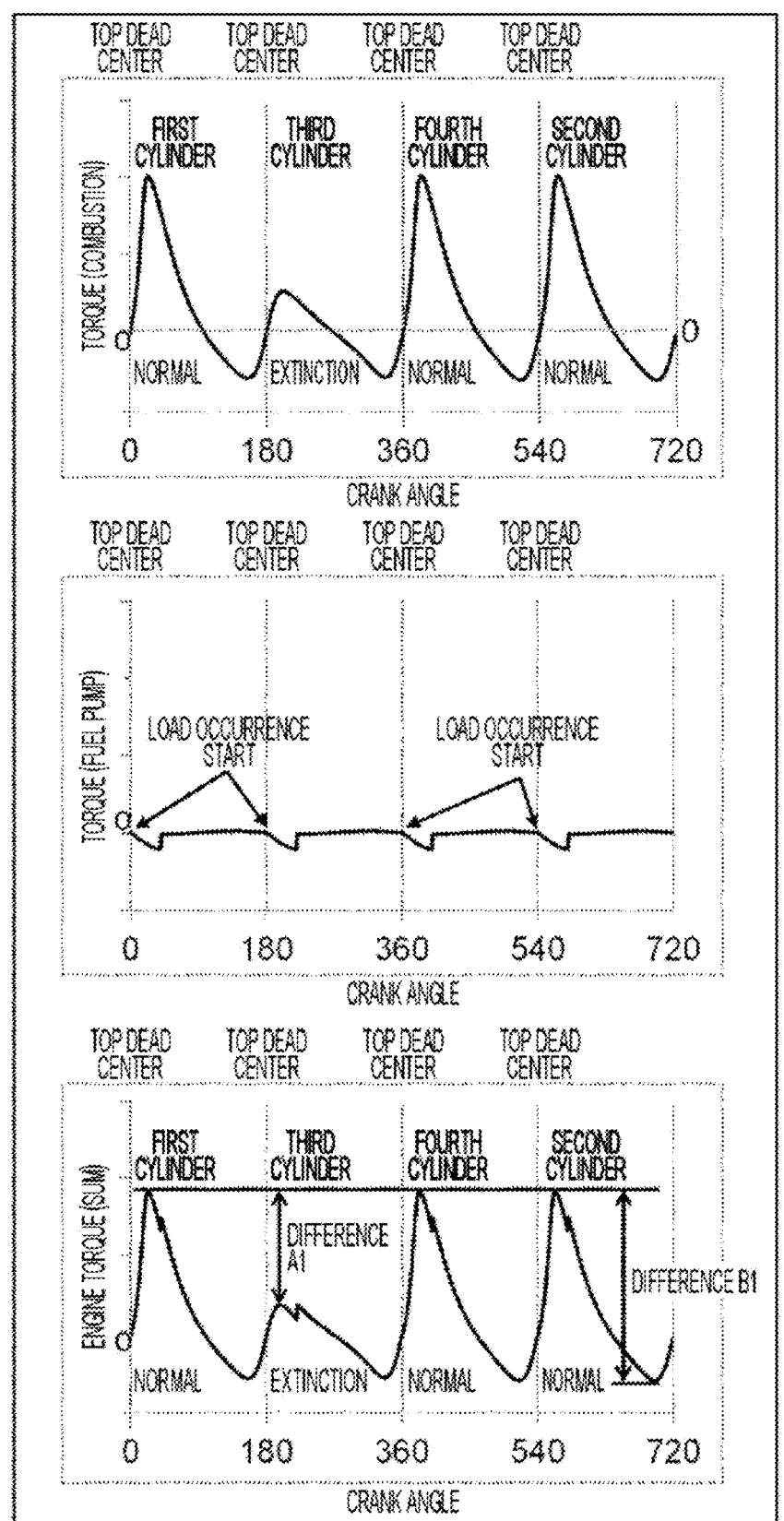
FIG. 11 is a diagram for describing an example of a combustion torque (engine torque) generated in the internal combustion engine of the embodiment.

Therefore, the drive torque of the pump drive cam 500 is set to be a maximum value after the piston 170 has exceeded the top dead center (see the middle part of FIG. 11).

Next, a change in an in-cylinder pressure P in the cylinder 150 will be described.

Figure 7:
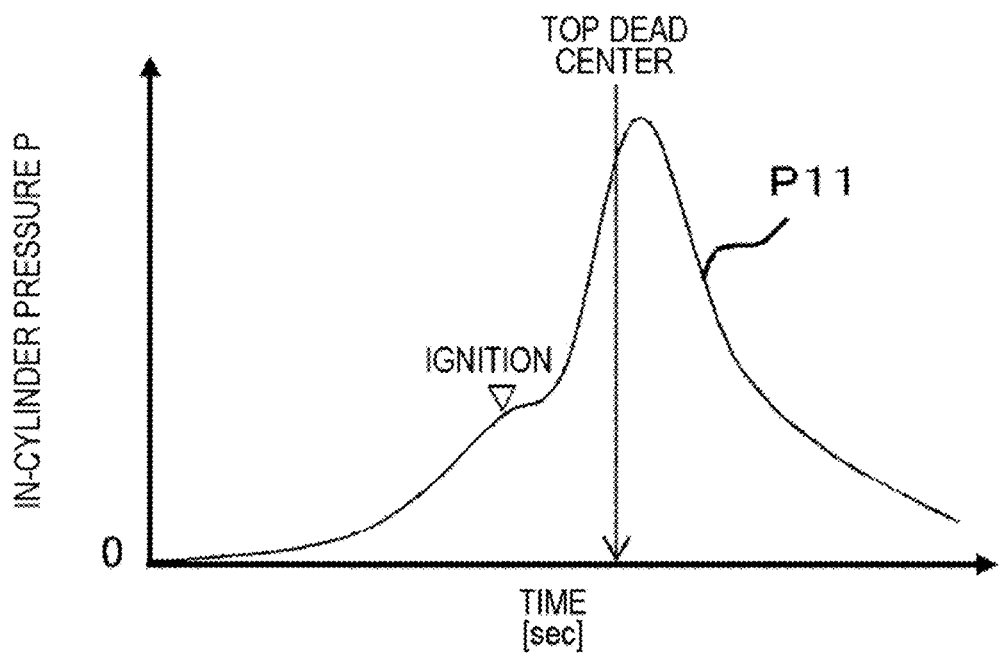
FIG. 7 is an example of a waveform of an in-cylinder pressure detected by a combustion pressure sensor.

FIG. 7 is an example of a waveform of the in-cylinder pressure detected by the combustion pressure sensor 140, and illustrates an example of an in-cylinder pressure P11 in a normal combustion state.

Figure 8:
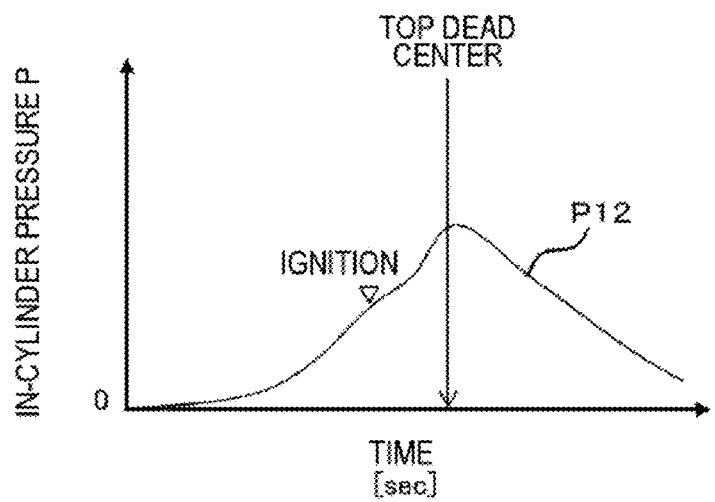
FIG. 8 is an example of a waveform of an in-cylinder pressure detected by a combustion pressure sensor.

FIG. 8 is an example of a waveform of the in-cylinder pressure detected by the combustion pressure sensor 140, and illustrates an example of an in-cylinder pressure P1 in a flame-out state.

In FIGS. 7 and 8, the horizontal axis represents time, and the vertical axis represents the in-cylinder pressure P.

As illustrated in FIG. 7, the in-cylinder pressure P11 of the cylinder 150 in the normal combustion state reaches a maximum value after the top dead center.

As illustrated in FIG. 8, the maximum value of an in-cylinder pressure P12 of the cylinder 150 in the flame-out state is smaller than the in-cylinder pressure P11 in the normal state, and the timing of the maximum value is close to the top dead center. Further, the flame-out state is a state in which combustion starts after ignition and then quenching occurs during combustion, for example, in a case where the air-fuel ratio in the cylinder 150 is lean.

Figure 9:
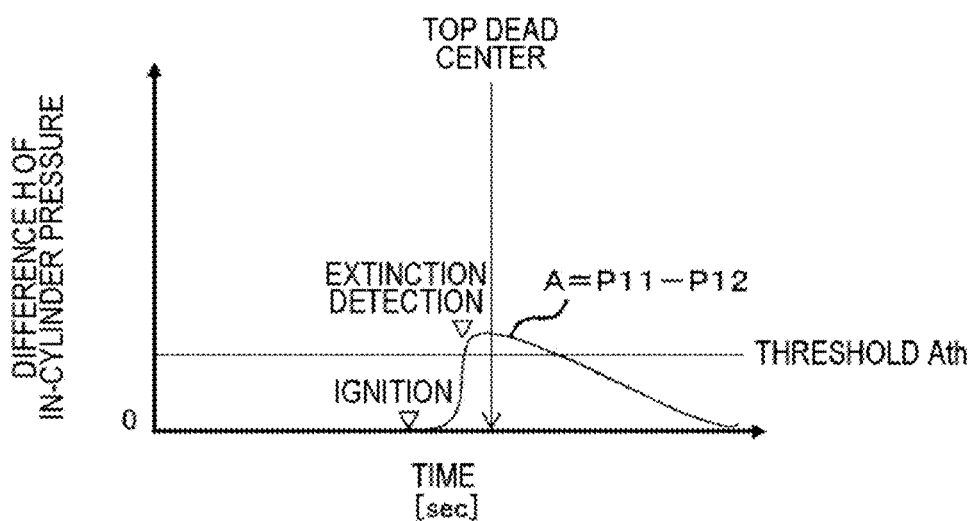
FIG. 9 is a diagram for describing an example of a difference between an in-cylinder pressure in a normal state and an in-cylinder pressure in a flame-out state.

Next, FIG. 9 is a diagram for describing an example of a difference A between the in-cylinder pressure P11 in a normal state and the in-cylinder pressure P12 in a flame-out state. In FIG. 9, the horizontal axis represents time, and the vertical axis represents the difference A (P11-P12) between the in-cylinder pressure P11 in the normal state and the in-cylinder pressure P12 in the flame-out state.

As illustrated in FIG. 9, during a period from ignition to the top dead center, in a case where the difference A between the maximum value of the in-cylinder pressure P11 in the normal state and the maximum value of the in-cylinder pressure P12 in the flame-out state has exceeded a predetermined threshold value Ath and becomes smaller, the control device 1 determines that the extinction has occurred in the cylinder 150.

The threshold value Ath is a value calculated in advance by measuring a plurality of in-cylinder pressures in the normal combustion state and a plurality of in-cylinder pressures in the flame-out state, and averaging the difference.

In the embodiment, in a case where the difference A between the maximum values of the in-cylinder pressures P in the predetermined cylinder 150 exceeds the predetermined threshold value Ath, the control device 1 determines that the extinction has occurred in the cylinder 150. At the top dead center, the drive torque of the pump drive cam 500 is reduced by opening the suction valve 1311 of the fuel pump 131 (see the middle part of FIG. 12).

[Operation of Control Device]

Next, an example of the combustion torque (engine torque) generated in the internal combustion engine 100 by the control device 1 will be described.

First, an example of a combustion torque (engine torque) generated in the conventional internal combustion engine 100 will be described.

Figure 10:
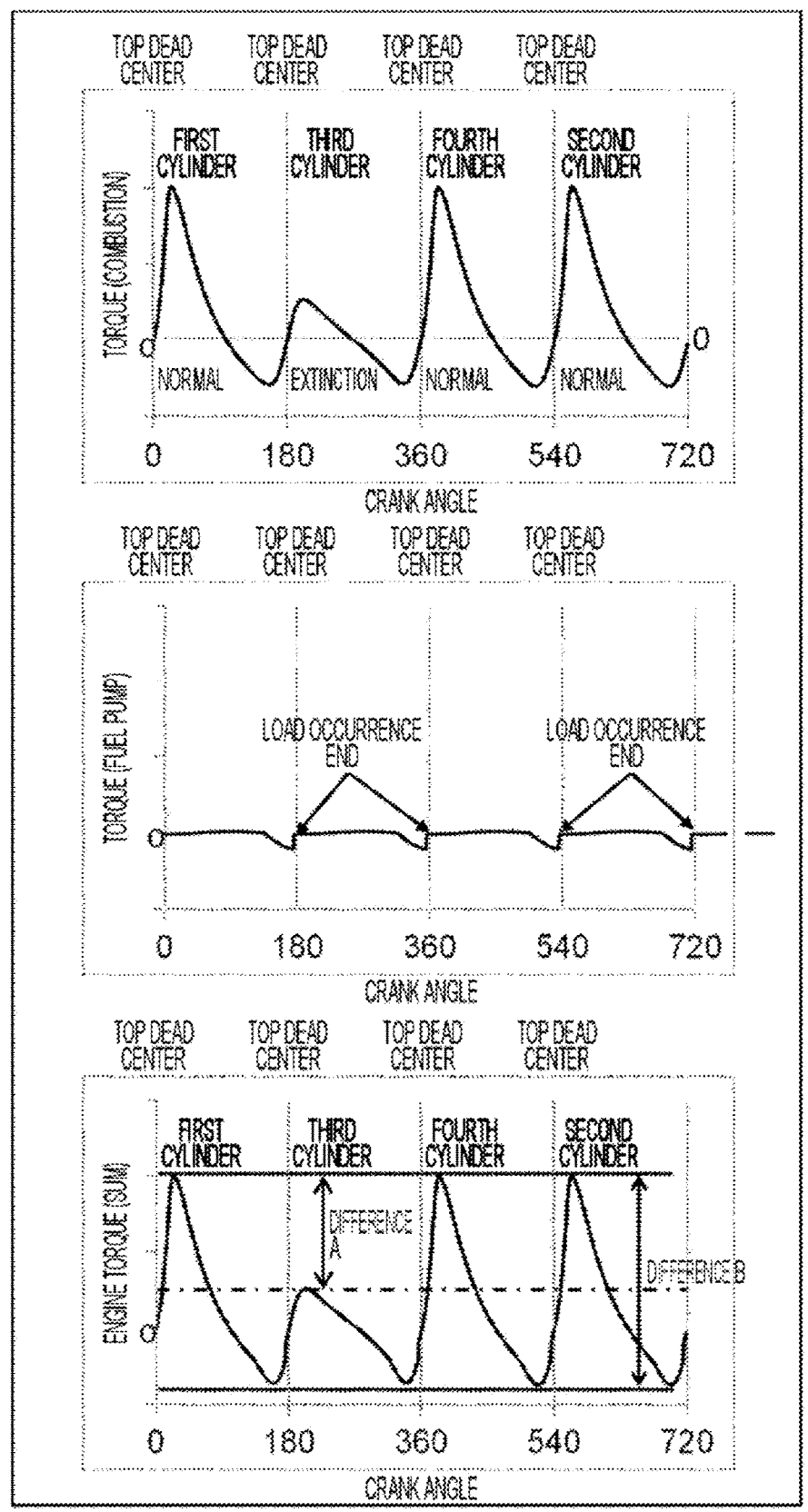
FIG. 10 is a diagram for describing an example of a combustion torque (engine torque) generated in a conventional internal combustion engine.

FIG. 10 is a diagram illustrating an example of a combustion torque (engine torque) generated in a conventional internal combustion engine 100.

The upper part of FIG. 10 is a diagram in which the horizontal axis represents the rotation angle (crank angle) of the crank shaft 123, and the vertical axis represents the combustion torque transmitted to the crank shaft 123 by the combustion in each cylinder 150. The middle part is a diagram in which the horizontal axis represents the crank angle, and the vertical axis represents the drive torque of the fuel pump 131 (the pump drive cam 500). The lower part is a diagram in which the horizontal axis represents the crank angle, and the vertical axis represents the sum of the combustion torque and the drive torque. The sum of the combustion torque and the drive torque is the torque (engine torque) output from the internal combustion engine 100.

FIG. 10 is a waveform example in a case where combustion of the first cylinder 151, the fourth cylinder 154, and the second cylinder 152 is in a normal state, and combustion of the third cylinder 153 is in a flame-out state.

As illustrated in the upper part of FIG. 10, in the internal combustion engine 100, combustion and explosion occur in each of the cylinders 151 to 154 every time the crank shaft 123 rotates 180 degrees, the combustion torque becomes a minimum value at a timing slightly before the top dead center (about 180 degrees, about 360 degrees, about 540 degrees, about 720 degrees), and the combustion torque becomes a maximum value at a timing slightly after the top dead center. Then, due to the extinction of the combustion in the third cylinder 153, the maximum value of the combustion torque of the third cylinder 153 is smaller than the maximum value of the combustion torque of the other cylinders 151, 152, and 154.

Next, as illustrated in the middle part of FIG. 10, the control device 1 closes the suction valve 1311 of the fuel pump 131 and raises the plunger 1313 by rotating the pump drive cam 500 at a timing slightly before the top dead center. Then, the pressure of the pressurizing chamber 1312 is increased. Then, the control device 1 opens suction valve 1311 at the timing of the top dead center, and reduces the pressure in pressurizing chamber 1312.

As a result, the drive torque (load) of the fuel pump 131 (the pump drive cam 500) becomes the minimum value just before the top dead center. The suction valve 1311 is opened at the top dead center and the pressure of the pressurizing chamber 1312 is released. Therefore, the phase of the load due to the driving of the pump drive cam 500 becomes a generation end position at the top dead center of the crank shaft 123.

Next, as illustrated in the lower part of FIG. 10, the total torque of the combustion torque of each cylinder 150 (the upper part of FIG. 10) and the drive torque of the pump drive cam 500 (the middle part of FIG. 10) becomes a torque (engine torque) output by the internal combustion engine 100. In the embodiment, since the drive torque of the pump drive cam 500 is a negative torque, it acts as a rotational load on the crank shaft 123.

As illustrated in the lower part of FIG. 10, as a result of the drive torque of the pump drive cam 500 (the middle part of FIG. 10) being added to the combustion torque (the upper part of FIG. 10), in each cylinder 150, slightly before the top dead center, the minimum value of the combustion torque becomes larger than before the addition.

In the embodiment, the difference between the combustion torque of the cylinders 151, 152, and 154 in the normal combustion state and the combustion torque of the third cylinder 153 in the flame-out state is A, and the internal combustion engine 100 vibrates irregularly due to the difference A. Therefore, the control device 1 is required to reduce the difference A in order to prevent the occurrence of irregular vibrations of the internal combustion engine 100 and to prevent the driver from feeling uncomfortable.

Further, in the internal combustion engine 100, the difference between the maximum value and the minimum value of the combustion torque of the cylinders 151, 152, and 154 in the normal combustion state is B, and the difference B also makes the absolute value of vibration of the internal combustion engine 100 large. The ride comfort of the driver is deteriorated. Therefore, in addition to reducing the difference A described above, the control device 1 is required to reduce the difference B between the maximum value and the minimum value of the combustion torque of the cylinder 150 in the normal combustion state.

Next, the combustion torque of the internal combustion engine 100 generated under the control of the control device 1 according to the embodiment will be described.

FIG. 11 is a diagram for describing an example of a combustion torque (engine torque) generated in the internal combustion engine 100 of the embodiment. The way of viewing FIG. 11 is the same as that of FIG. 10, and will be described as necessary.

In the above-described conventional example, the phase of the load on the pump drive cam 500 is the end position of the occurrence of the load on the pump drive cam 500 at the top dead center of the crank shaft 123. In the embodiment, as illustrated in the middle part of FIG. 11, the phase of the load of the pump drive cam 500 is different from that of the above-described embodiment in that the load of the pump drive cam 500 starts at the top dead center of the crank shaft 123.

The upper part of FIG. 11 illustrates the same waveform as that of the upper part of FIG. 10, and illustrates the combustion torque of each cylinder 150, and the extinction of combustion occurs in the third cylinder 153.

As illustrated in the middle part of FIG. 11, at the top dead center, the control device 1 closes the suction valve 1311 of the fuel pump 131, raises the plunger 1313 by rotating the pump drive cam 500, and increases the pressure in the pressurizing chamber 1312.

As a result, the drive torque (load) of the fuel pump 131 (the pump drive cam 500) becomes the minimum value at a timing slightly after the top dead center. Therefore, the phase of the load due to the driving of the pump drive cam 500 is the start position of occurrence at the top dead center of the crank shaft 123.

Then, as illustrated in the lower part of FIG. 11, as a result of the drive torque of the pump drive cam 500 (the middle part of FIG. 11) being added to the combustion torque (the upper part of FIG. 11), in each cylinder 150, slightly after the top dead center, the maximum value of the combustion torque is reduced by the drive torque.

As a result, a difference B1 between the maximum value and the minimum value of the engine torque of each cylinder 150 becomes smaller than the above-mentioned difference B of the conventional example (B1<B). Therefore, the absolute value of vibration of the internal combustion engine 100 becomes small, and it is possible to prevent the ride comfort of the driver from deteriorating.

Further, both the maximum value of the combustion torque of each of the cylinders 151, 152, and 154 in the normal combustion state and the maximum value of the combustion torque of the cylinder 153 in the flame-out state become smaller due to the drive torque of the pump drive cam 500. The difference A1 between the maximum value of the combustion torque of each of the cylinders 151, 152, and 154 in the normal combustion state and the maximum value of the combustion torque of the cylinder 153 in the flame-out state is not so different from the above-described difference A (A1≈A).

Second Embodiment

Therefore, in a second embodiment, the suppression of (or the stop of) the drive of the pump drive cam 500 at the maximum value of the combustion torque of the cylinder in which the quenching has occurred (the cylinder 153 in the embodiment) prevents the quenching. The decrease in engine torque in the generated cylinder (the cylinder 153) is suppressed.

Figure 12:
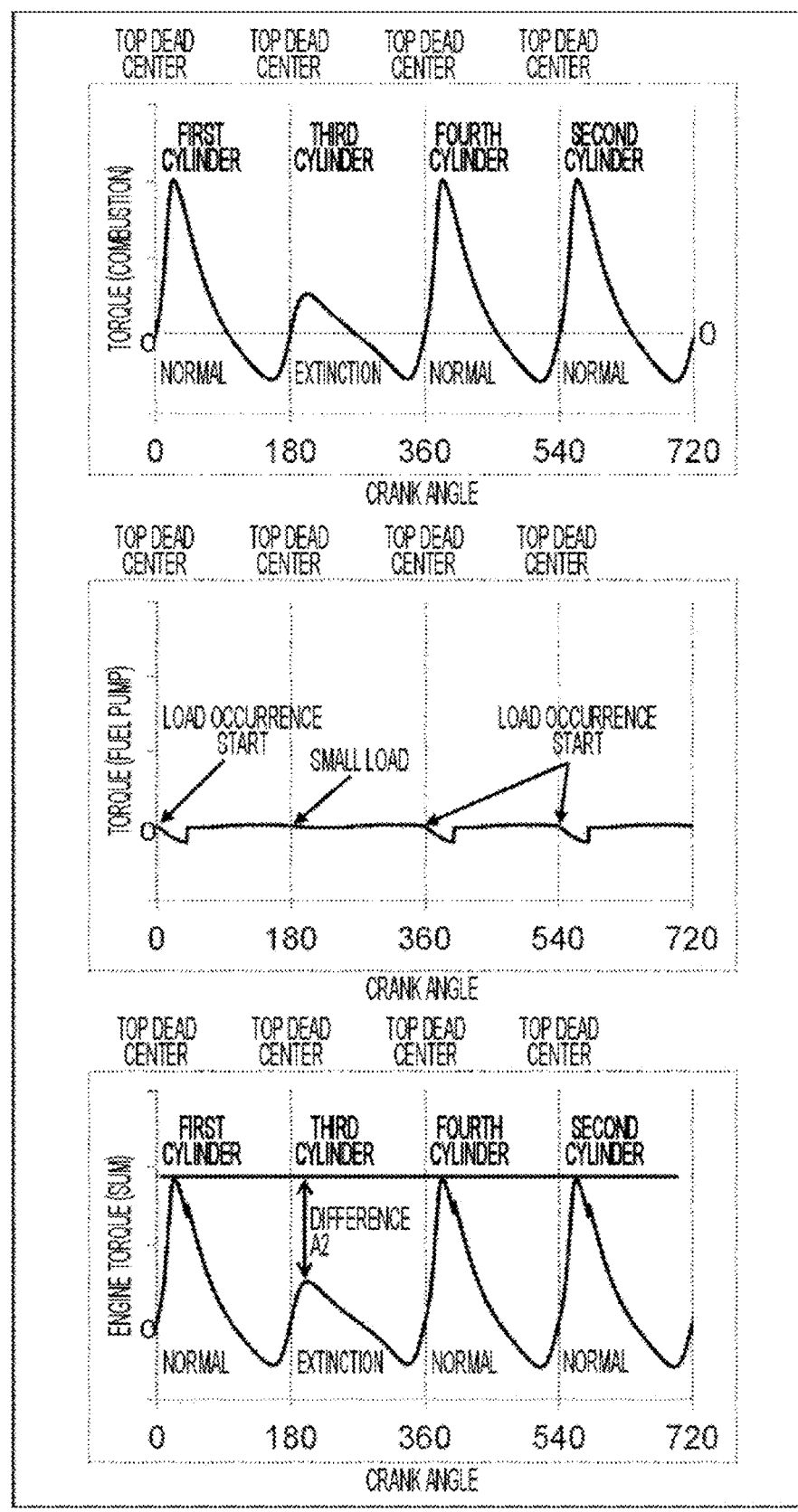
FIG. 12 is a diagram for describing an example of a combustion torque (engine torque) generated in an internal combustion engine according to a second embodiment.

FIG. 12 is a diagram for describing an example of a combustion torque (engine torque) generated in an internal combustion engine 100A according to the second embodiment. The way of viewing FIG. 12 is the same as that of FIG. 10, and will be described as necessary.

The upper part of FIG. 12 illustrates the same waveform as that of the upper part of FIG. 10 (or FIG. 11), and illustrates the combustion torque of each cylinder 150, and the extinction of combustion occurs in the third cylinder 153.

As illustrated in the middle part of FIG. 12, the control device 1 continues to open the suction valve 1311 of the fuel pump 131 at the timing before and after the top dead center of the third cylinder in which the extinction has occurred, and suppresses the drive torque of the pump drive cam 500.

As a result, as illustrated in the lower part of FIG. 12, even if the drive torque of the pump drive cam 500 (the middle part of FIG. 12) is added to the combustion torque (the upper part of FIG. 12), it is possible to suppress the reduction of the engine torque due to the drive torque in the third cylinder 153.

Therefore, a difference A2 between the maximum value of the engine torque of each of the cylinders 151, 152, and 154 in the normal combustion state and the maximum value of the engine torque of the third cylinder 153 in the flame-out state becomes smaller than the difference A of the conventional example described above (A2<A). Therefore, the irregular vibration of the internal combustion engine 100 can be suppressed, and the driver's discomfort can be reduced.

[Control Method of Fuel Pump]

Next, a control method of the fuel pump 131 by the control device 1 will be described. The process of FIG. 13 is a process executed by the control device 1 by executing a predetermined control program.

Figure 13:
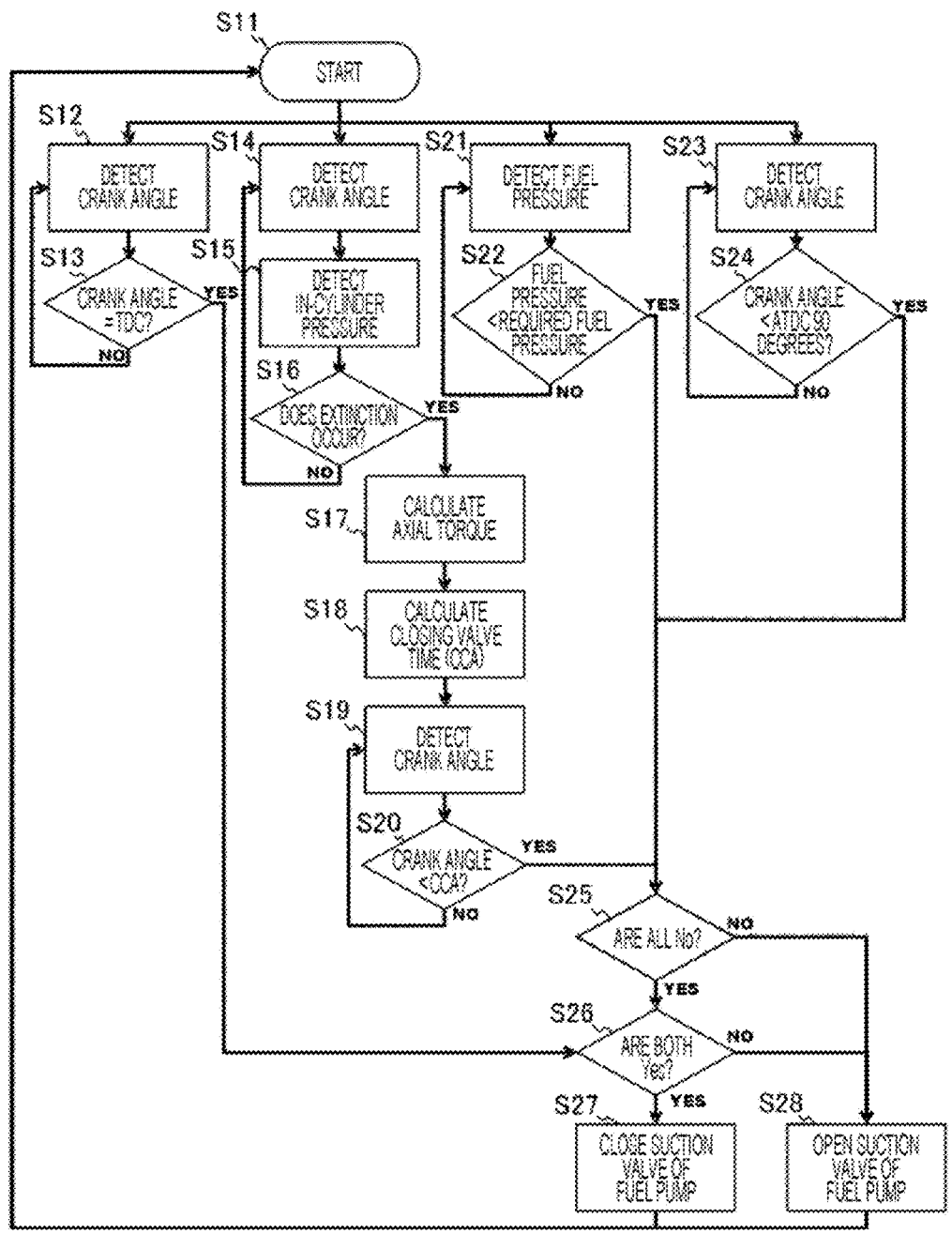
FIG. 13 is a flowchart of a control method of the fuel pump by the control device according to the embodiment.

FIG. 13 is a flowchart of a control method of the fuel pump 131 by the control device 1.

First, in Step S11, the control device 1 starts controlling the fuel pump 131.

In Step S12, the control device 1 detects the rotation angle of the crank shaft 123 using the crank angle sensor 121.

In Step S13, the control device 1 determines whether the detected crank angle is at the top dead center (TDC). In a case where the crank angle is at TDC (Step S13: Yes), the control device 1 proceeds to Step S26. On the other hand, in a case where the crank angle is not at TDC (Step S13: No), the control device 1 returns to Step S12 and repeats the processing of Steps S12 and S13 until it is determined that the crank angle has become TDC.

In Step S14, the control device 1 detects the rotation angle of the crank shaft 123 using the crank angle sensor 121, as in Step S12.

In Step S15, the control device 1 detects the in-cylinder pressure P of each cylinder 150 (in the embodiment, the first cylinder 151, the second cylinder 152, the third cylinder 153, and the fourth cylinder 154) by the combustion pressure sensor 140.

In Step S16, the control device 1 determines whether extinction has occurred in any one of the cylinders 150. In a case where it is determined that the extinction has occurred in any of the cylinders (Step S16: Yes), the control device 1 proceeds to Step S17. In a case where it is determined that the extinction has not occurred (Step S16: No), the process proceeds to Step S14, and detect the crank angle again.

Here, the extinction has occurred by the control device 1 is determined when the difference A between the in-cylinder pressure in the normal combustion state of each cylinder 150 detected by the combustion pressure sensor 140 and the in-cylinder pressure in the flame-out state is calculated, and the difference A exceeds a predetermined threshold value Ath. In a case where the difference A in the in-cylinder pressure exceeds the predetermined threshold value Ath and becomes small, the control device 1 determines that the flame has quenched in the cylinder.

In Step S17, the control device 1 calculates the combustion torque of each cylinder 150 (combustion torque of the crank shaft 123) based on the crank angle detected in Step S14 and the in-cylinder pressure detected in Step S15.

In Step S18, the control device 1 calculates a timing (CCA) for closing the suction valve 1311 of the fuel pump 131 based on the combustion torque of the crank shaft 123 calculated in Step S17.

Specifically, the control device 1 calculates the timing for closing the suction valve 1311 such that a timing when the combustion torque of the crank shaft 123 becomes the maximum value and a timing when the drive torque of the pump drive cam 500 of the fuel pump 131 becomes the maximum value by the combustion in each cylinder 150 are matched.

In the embodiment, the control device 1 acquires measured values of the combustion torque of the crank shaft 123 and the drive torque of the pump drive cam 500, and creates and stores in advance a data table or map in which the measured values are stored in association with each other. The control device 1 refers to the data table or the map stored in advance so that the timing at which the combustion torque of the crank shaft 123 reaches the maximum value is matched with the timing at which the drive torque of the pump drive cam 500 reaches the maximum value. Then, the closing timing of the suction valve 1311 is calculated.

Further, the control device 1 may calculate the timing for closing the suction valve 1311 of the fuel pump 131 with reference to the timing at which the combustion torque of the crank shaft 123 due to combustion in the previous (past) combustion cycle becomes the maximum value.

In Step S19, the control device 1 detects the current rotation angle (crank angle) of the crank shaft 123 using the crank angle sensor 121.

In Step S20, the control device 1 determines whether the crank angle acquired in Step S19 is less than the timing (CCA) for closing the suction valve 1311. In a case where it is determined that the crank angle is less than CCA (Step S20: Yes), the process proceeds to Step S25. In a case where it is determined that the crank angle is not less than CCA (Step S20: No), the process returns to Step S19, and the crank angle is detected again.

Here, the control device 1 measures the fuel injection pressure (fuel pressure) at the fuel injection valve 134 with the fuel pressure sensor 135 in Step S21.

In Step S22, the control device 1 determines whether the fuel injection pressure (fuel pressure) measured in Step S21 is lower than a predetermined required fuel pressure. In a case where it is determined that the fuel injection pressure is lower than the required fuel pressure (Step S22: Yes), the process proceeds to Step S25. In a case where it is determined that the pressure is equal to or higher than the required fuel pressure (Step S22: No), the process proceeds to Step S21, and the fuel injection pressure (fuel pressure) is measured again.

In Step S23, the control device 1 detects the rotation angle (crank angle) of the crank shaft 123 with the crank angle sensor 121 at the same time as Steps S12 and S14.

In Step S24, the control device 1 determines whether the crank angle detected in Step S23 is less than 90 degrees after the top dead center. In a case where it is determined that the crank angle is less than 90 degrees after the top dead center (Step S24: Yes), the process proceeds to Step S25. In a case where it is determined that the crank angle is 90 or more after the top dead center (Step S24: No), the process returns to Step S23, and the crank angle is detected again.

In Step S25, the control device 1 proceeds to Step S26 in a case where all the results of Steps S20, S22, and S24 are No, and proceeds to Step S28 in a case where all the results of Steps S20, 22, and S24 are not No.

In Step S26, the control device 1 proceeds to Step S27 in a case where both the results of Steps S25 and S13 are Yes, and proceeds to Step S28 in a case where both Steps S25 and S13 are not Yes.

In Step S27, the control device 1 performs control to close the suction valve 1311 of the fuel pump 131, and then returns to Step S11.

In Step S28, the control device 1 performs control to open the suction valve 1311 of the fuel pump 131, and then returns to Step S11.

Next, a control method of the fuel pump 131 by a control device 1A according to another embodiment will be described. The process of FIG. 14 is a process executed by control device 1A by executing a predetermined control program.

Figure 14:
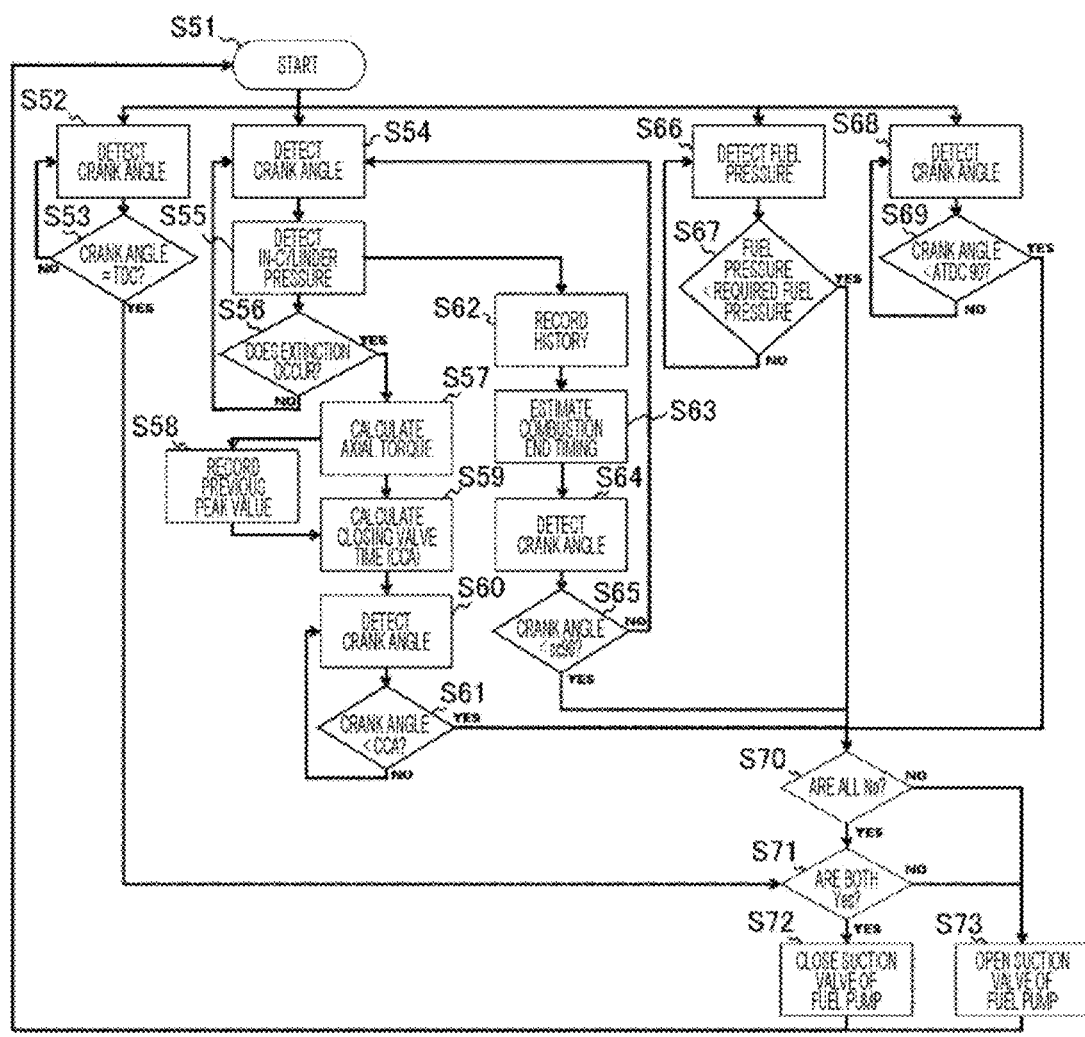
FIG. 14 is a flowchart of a method for controlling the fuel pump by the control device according to another embodiment.

FIG. 14 is a flowchart of a control method of the fuel pump 131 by the control device 1.

First, in Step S51, the control device 1A starts controlling the fuel pump 131.

In Step S52, the control device 1A detects the rotation angle of the crank shaft 123 using the crank angle sensor 121.

In Step S53, the control device 1A determines whether the detected crank angle is at the top dead center (TDC). In a case where the crank angle is at TDC (Step S53: Yes), the control device 1A proceeds to Step S71. On the other hand, in a case where the crank angle is not at TDC (Step S53: No), the control device 1A returns to Step S52, and repeats the processes of Steps S52 and S53 until determining that the crank angle is at TDC.

In Step S54, the control device 1A detects the rotation angle of the crank shaft 123 using the crank angle sensor 121, as in Step S52.

In Step S55, the control device 1A detects the in-cylinder pressure P of each cylinder 150 (in the embodiment, the first cylinder 151, the second cylinder 152, the third cylinder 153, and the fourth cylinder 154) by the combustion pressure sensor 140.

In Step S56, the control device 1A determines whether extinction has occurred in any of the cylinders 150. In a case where it is determined that the extinction has occurred in any of the cylinders (Step S56: Yes), the control device 1A proceeds to Step S57. In a case where it is determined that the extinction has not occurred (Step S56: No), the process proceeds to Step S54, and detect the crank angle again.

In Step S57, the control device 1A calculates the combustion torque of each cylinder 150 (torque of the crank shaft 123) based on the crank angle detected in Step S54 and the in-cylinder pressure detected in Step S55.

In Step S58, the control device 1A stores the combustion torque of each cylinder 150, and records the maximum value of the combustion torque in the previous combustion cycle.

In Step S59, the control device 1A calculates a timing (CCA) for closing the suction valve 1311 of the fuel pump 131 based on the combustion torque of the crank shaft 123 calculated in Step S57.

In Step S60, the control device 1A detects the current rotation angle (crank angle) of the crank shaft 123 using the crank angle sensor 121.

In Step S61, the control device 1A determines whether the crank angle acquired in Step S60 is less than the timing (CCA) for closing the suction valve 1311. In a case where it is determined that the crank angle is less than CCA (Step S61: Yes), the process proceeds to Step S70. In a case where it is determined that the crank angle is not less than CCA (Step S61: No), the process returns to Step S60, and the crank angle is detected again.

In Step S62, the control device 1A stores the crank angle detected in Step S54 and the in-cylinder pressure P of each cylinder 150 detected in Step S55 as a history.

In Step S63, the control device 1A performs a combustion analysis process based on the history recorded in Step S62, and calculates the combustion end timing in each cylinder 150. The control device 1A estimates the combustion end timing (CC90) of the next combustion cycle based on the calculation result.

In Step S64, the control device 1A detects the current rotation angle (crank angle) of the crank shaft 123 using the crank angle sensor 121.

In Step S65, the control device 1A determines whether the crank angle detected in Step S64 is less than the combustion end timing (CC90). In a case where it is determined that the crank angle is less than CC90 (Step S65: Yes), the control device 1A proceeds to Step S70. In a case where it is determined that the crank angle is equal to or more than CC90 (Step S65: No), the process returns to Step S54, and the current crank angle is detected again.

Here, the control device 1A measures the fuel injection pressure (fuel pressure) at the fuel injection valve 134 with the fuel pressure sensor 135 in Step S66.

Then, in Step S67, the control device 1 determines whether the fuel injection pressure (fuel pressure) measured in Step S66 is lower than a predetermined required fuel pressure. In a case where it is determined that the fuel injection pressure is lower than the required fuel pressure (Step S67: Yes), the process proceeds to Step S70. In a case where it is determined that the pressure is equal to or higher than the required fuel pressure (Step S67: No), the process proceeds to Step S66, and the fuel injection pressure (fuel pressure) is measured again.

In Step S68, the control device 1A detects the rotation angle (crank angle) of the crank shaft 123 with the crank angle sensor 121 at the same time as Steps S52 and S54.

In Step S69, the control device 1A determines whether the crank angle detected in Step S68 is less than 90 degrees (ATDC90) after the top dead center. In a case where it is determined that the crank angle is less than 90 degrees after the top dead center (Step S69: Yes), the process proceeds to Step S70. In a case where it is determined that the crank angle is 90 or more after the top dead center (Step S69: No), the process returns to Step S68, and the crank angle is detected again.

In Step S70, the control device 1A proceeds to Step S71 in a case where all the results of Steps S61, S67 and S69 are No, and proceeds to Step S73 in a case where all the results of Steps S61, 67 and S69 are not No.

In Step S71, the control device 1A proceeds to Step S72 in a case where both the results of Steps S70 and S53 are Yes, and proceeds to Step S73 in a case where both Steps S70 and S53 are not Yes.

In Step S72, the control device 1A performs control to close the suction valve 1311 of the fuel pump 131, and then returns to Step S51.

In Step S73, the control device 1A performs control to open the suction valve 1311 of the fuel pump 131, and then returns to Step S51.

As described above, in the control method according to the modification, the control device 1A stores the maximum value of the combustion torque in Step S58, and calculates the valve closing timing based on the maximum value of the combustion torque in Step S59. Therefore, it is possible to determine a more appropriate valve closing timing based on the past combustion torque.

In addition, the control device 1A stores the crank angle detected in Step S54 and the in-cylinder pressure P of each cylinder 150 detected in Step S55 as a history, and estimates the combustion end timing in Step S63 based on this history. Therefore, the control device 1 can more appropriately and accurately estimate the combustion end timing based on the past history information.

As described above, in the embodiment, (1) The control device of the internal combustion engine 100 having the plurality of cylinders 150 (the first cylinder 151, the second cylinder 152, the third cylinder 153, and the fourth cylinder 154) includes a combustion state detection unit (the process of Step S16 or S56 by the control device 1) which detects whether the plurality of cylinders 150 are in a normal combustion state or a flame-out state (an abnormal combustion state), and the control device 1 (control unit) which controls driving of a vehicle auxiliary machine (for example, a fuel pump) serving as a load of the combustion torque (see the upper part of FIGS. 11 and 12) generated by the cylinder 150. The control device 1 is configured to suppress the driving of the vehicle auxiliary machine at a predetermined combustion timing of the third cylinder 153 in the flame-out state in a case where any one (for example, the third cylinder 153) of the plurality of cylinders 150 is in the flame-out state.

With this configuration, the control device 1 suppresses the driving of the vehicle auxiliary machine (for example, the fuel pump) serving as a load of the combustion torque of the third cylinder at the combustion timing of the cylinder in which the extinction has occurred (for example, the third cylinder 153). Therefore, it is possible to suppress the fluctuation of the combustion torque of the third cylinder 153 in which the extinction has occurred. Therefore, the irregular vibration of the internal combustion engine 100 can be suppressed, and deterioration of the ride comfort of the driver can be prevented.

(2) In addition, the predetermined combustion timing is the top dead center (TDC) of the piston 170 in the cylinder in which the extinction has occurred (for example, the third cylinder 153), and the control device 1 is configured to drive the vehicle auxiliary machine not to generate a load on the vehicle auxiliary machine at the top dead center of the piston 170 of the third cylinder 153 in which the extinction has occurred.

With this configuration, the control device 1 can suppress a decrease in the combustion torque at the top dead center of the cylinder (for example, the third cylinder 153) in which the extinction has occurred due to the load of the vehicle auxiliary machine.

Therefore, the irregular vibration of the internal combustion engine 100 can be suppressed, and the driver's discomfort can be reduced.

(3) In addition, the predetermined combustion timing is the top dead center (TDC) of the piston 170 in the cylinder 150, and the control device 1 is configured to drive the vehicle auxiliary machine such that the load of the vehicle auxiliary machine becomes the maximum value at the top dead center (TDC) of the piston 170.

With this configuration, the control device 1 can reduce the amplitude of combustion torque at the top dead center in cylinder 150 as a whole. Therefore, the vibration of the internal combustion engine 100 can be reduced as a whole, and deterioration of the ride comfort of the driver can be prevented.

(4) In addition, based on the determination that the combustion torque in a predetermined one (for example, the third cylinder 153 in which extinction has occurred) among the plurality of cylinders 150 is lowered as much or more than the threshold value Ath with respect to the combustion torque in the normal combustion state of any cylinder 150, the control device 1 suppresses the driving of the vehicle auxiliary machine at the top dead center of the piston 170 of the cylinder (for example, the third cylinder 153 in which extinction has occurred) of which the combustion torque has lowered as much or more than the threshold value Ath.

With this configuration, the control device 1 determines that the extinction has occurred in a case where it is determined that the difference between the combustion torque in the normal combustion state and the combustion torque in the predetermined cylinder 150 is lower than or equal to the predetermined threshold value Ath. Therefore, control for suppressing the driving of the vehicle auxiliary machine can be appropriately performed.

(5) In addition, the vehicle auxiliary machine is a fuel pump 131 that supplies fuel to the cylinder 150. Based on the determination that the combustion torque in a predetermined cylinder (for example, the third cylinder 153 in which extinction has occurred) is lowered as much or more than the threshold value Ath (predetermined threshold) with respect to the combustion torque in the normal combustion state of the predetermined cylinder 150, the control device 1 is configured to drive the fuel pump 131 such that the drive torque of the fuel pump 131 becomes the maximum value at the top dead center of the piston 170 of the third cylinder 153 of which the combustion torque is lowered as much or more than the threshold value Ath.

With this configuration, the driving of the fuel pump 131 is linked to the crank shaft 123 that drives the piston 170, so that the combustion torque due to the movement of the piston 170 and the drive torque of the fuel pump 131 are linked to efficiently control the fluctuation of the combustion torque.

(6) In addition, the fuel pump 131 includes a pressurizing chamber 1312 in which fuel is pressurized, a suction valve 1311 for controlling the supply of fuel to the pressurizing chamber 1312, a plunger 1313 for pressurizing the fuel of the pressurizing chamber 1312 by driving in the vertical direction, and a pump drive cam 500 for driving the plunger 1313 in the vertical direction. The number of vertices of the pump drive cam 500 in a sectional view is set to be matched with the number of cylinders 150.

With this configuration, the waveform of the combustion torque in the cylinder 150 and the waveform of the drive torque for driving the pump drive cam 500 have the same phase. Accordingly, it is possible to match the maximum value of the combustion torque with the maximum value of the drive torque, thereby facilitating the control for reducing the fluctuation of the combustion torque.

(7) In addition, a combustion pressure sensor 140 (in-cylinder pressure sensor) that detects the pressure in each of the plurality of cylinders 150, and a crank angle sensor 121 that detects the rotation angle of the crank shaft 123 of the internal combustion engine 100 are provided. The control device 1 calculates the combustion torque of the cylinder 150 based on the pressure of the cylinder 150 detected by the combustion pressure sensor 140 and the rotation angle of the crank shaft 123 detected by the crank angle sensor 121. The fuel pump 131 is driven such that the drive torque of the fuel pump 131 becomes the maximum value at the top dead center of the piston 170 of a cylinder (for example, the third cylinder 153) determined that the combustion torque of the cylinder 150 is lower than or equal to the threshold value Ath with respect to the combustion torque of the cylinder 150 in the normal combustion state.

With this configuration, the control device 1 can appropriately calculate the combustion torque based on the in-cylinder pressure detected by the combustion pressure sensor 140 and the crank angle detected by the crank angle sensor 121. It is possible to appropriately detect the extinction on the basis of the combustion torque, and suppress the combustion torque.

(8) In addition, in a case where the combustion torque of the cylinder 150 is lowered as much or more than the threshold value Ath with respect to the combustion torque in the normal combustion state of the cylinder 150, the control device 1 (combustion state detection unit) determines that extinction has occurred in the cylinder (for example, the third cylinder 153).

With this configuration, the control device 1 can appropriately determine the flame-out state of the cylinder 150.

Hitherto, while the embodiments of the invention have been described as an example, the invention may be realized by combining all the embodiments, or by appropriately combining any two or more embodiments.

In addition, the invention is not limited to the one having all the configurations of the above-described embodiments. A part of the configuration of the above-described embodiment may be replaced with the configuration of another embodiment. In addition, the configuration of the above-described embodiment may be replaced with the configuration of another embodiment.

In addition, a part of the configuration of the above-described embodiment may be added to, deleted from, or replaced with the configuration of another embodiment.

Further, in the above-described embodiment, the pump drive cam 500 has been described by exemplifying a case in which the pump drive cam 500 has a quadrangular shape in a cross-sectional view, but the shape of the pump drive cam 500 is not limited thereto, and may be a polygonal shape, an elliptical shape, or any other variable shape.

In addition, in the above-described embodiment, the case where the fuel pump 131 is illustrated as an auxiliary device that becomes a rotational load of the crank shaft 123 and the driving of the fuel pump 131 is suppressed has been described, but the invention is not limited thereto. The auxiliary device that suppresses driving may be, for example, an alternator, which is an auxiliary device that loads the engine torque, in addition to the fuel pump 131 described above.

REFERENCE SIGNS LIST 1 control device
5 camshaft
5a intake camshaft
5b exhaust camshaft
6a intake valve
6b exhaust valve
10 analog input unit
20 digital input unit
30 A/D conversion unit
40 RAM
50 MPU
60 ROM
70 I/O port
80 output circuit
81 overall control unit
82 fuel injection control unit
83 ignition control unit
84 cylinder discrimination unit
85 angle information generation unit
86 rotation Speed information generation unit
87 intake air amount measuring unit
88 load information generation unit
89 water temperature measuring unit
100 internal combustion engine
110 air cleaner
111 old period
112 intake manifold
113 throttle valve
113a throttle opening sensor
114 flow sensor
115 intake air temperature sensor
116 intake pressure sensor
120 ring gear
121 crank angle sensor
122 water temperature sensor
123 crank shaft
125 accelerator pedal
126 accelerator position sensor
130 fuel tank
131 fuel pump
1311 suction valve
1312 pressurizing chamber
1313 plunger
132 pressure regulator
133 fuel pipe
134 fuel injection valve
135 fuel pressure sensor
140 combustion pressure sensor
150 to 154 cylinder
150a combustion chamber
160 exhaust manifold 161 three-way catalyst
162 upstream air-fuel ratio sensor
163 downstream air-fuel ratio sensor
164 exhaust gas temperature sensor
170 piston
180 cylinder head
200 ignition plug
500 pump drive cam

The invention claimed is:

1. A control device for an internal combustion engine which includes a plurality of cylinders, the control device comprising:
   a combustion state detection unit that detects whether the plurality of cylinders are in a normal combustion state or an abnormal combustion state; and
   a control unit that controls driving of a vehicle auxiliary machine that is a load of a combustion torque generated in the cylinder,
   wherein, in a case where it is determined that any one of the plurality of cylinders is in an abnormal combustion state, the control unit suppresses driving of the vehicle auxiliary machine at a predetermined combustion timing of the cylinder in the abnormal combustion state.

2. The control device for an internal combustion engine according to claim 1,
   wherein the predetermined combustion timing is a top dead center of a piston in the cylinder in the abnormal combustion state, and
   wherein the control unit drives the vehicle auxiliary machine such that a load on the vehicle auxiliary machine is not generated at the top dead center of the piston of the cylinder in the abnormal combustion state.

3. The control device for an internal combustion engine according to claim 2,
   wherein, based on a determination that a combustion torque in a predetermined one of the plurality of cylinders is lowered as much or more than a first threshold value with respect to a combustion torque in the normal combustion state of the predetermined cylinder, the control unit suppresses driving of the vehicle auxiliary machine at the top dead center of the piston of the cylinder which is determined such that the combustion torque is lowered as much or more than the first threshold value.

4. The control device for an internal combustion engine according to claim 3,
   wherein the vehicle auxiliary machine is a fuel pump that supplies fuel to the cylinder,
   wherein, based on a determination that the combustion torque in the predetermined cylinder is lowered as much or more than the first threshold value with respect to the combustion torque in the normal combustion state of the predetermined cylinder, the control unit drives the fuel pump such that a drive torque of the fuel pump becomes a maximum value at the top dead center of the piston of the cylinder which is determined such that the combustion torque is lowered as much or more than the first threshold value.

5. The control device for an internal combustion engine according to claim 4,
   wherein the fuel pump includes a pressurizing chamber in which fuel is pressurized, a suction valve that controls supply of fuel to the pressurizing chamber, and a plunger that pressurizes the fuel in the pressurizing chamber by driving vertically, and a cam which drives the plunger in the vertical direction, and
   wherein the number of vertices of the cam in a sectional view is set to be equal to the number of cylinders.

6. The control device for an internal combustion engine according to claim 5, further comprising:
   an in-cylinder pressure sensor that detects each pressure in the plurality of cylinders; and
   a crank angle sensor that detects a rotation angle of a crank shaft of the internal combustion engine,
   wherein the control unit calculates a combustion torque of the cylinder based on a pressure of the cylinder detected by the in-cylinder pressure sensor and a rotation angle of the crank shaft detected by the crank angle sensor, and drives the fuel pump such that a drive torque of the fuel pump becomes a maximum value at the top dead center of the piston of the cylinder which is determined such that the combustion torque of the cylinder is lowered as much or more than the first threshold value with respect to the normal combustion state of the cylinder.

7. The control device of an internal combustion engine according to claim 6,
   wherein, in a case where a combustion torque of the cylinder is lowered as much or more than the first threshold value with respect to the combustion torque in the normal combustion state of the cylinder, the combustion state detection unit determines that extinction has occurred in the cylinder.

8. The control device for an internal combustion engine according to claim 1,
   wherein the predetermined combustion timing is a top dead center of a piston in the cylinder, and
   wherein the control unit drives the vehicle auxiliary machine such that a load on the vehicle auxiliary machine becomes a maximum value at the top dead center of the piston.

* * * * *